(12) United States Patent
Shimura

(10) Patent No.: US 7,978,051 B2
(45) Date of Patent: *Jul. 12, 2011

(54) RFID INTERROGATOR DEVICE

(75) Inventor: Takahiro Shimura, Gotemba (JP)

(73) Assignee: Toshiba Tec Kabushiki Kaisha (JP)

( * ) Notice: Subject to any disclaimer, the term of this patent is extended or adjusted under 35 U.S.C. 154(b) by 1026 days.

This patent is subject to a terminal disclaimer.

(21) Appl. No.: 11/879,971

(22) Filed: Jul. 19, 2007

(65) Prior Publication Data

US 2008/0024281 A1    Jan. 31, 2008

(30) Foreign Application Priority Data

Jul. 31, 2006    (JP) .................................. 2006-208834

(51) Int. Cl.
*H04Q 5/22* (2006.01)
(52) U.S. Cl. ..................................... 340/10.3; 340/10.4
(58) Field of Classification Search .................. None
See application file for complete search history.

(56) References Cited

U.S. PATENT DOCUMENTS

| | | | |
|---|---|---|---|
| 5,235,326 A | | 8/1993 | Beigel et al. |
| 5,375,252 A * | | 12/1994 | Hashimoto ................. 340/7.27 |
| 5,376,975 A * | | 12/1994 | Romero et al. .............. 340/7.34 |
| 5,546,077 A * | | 8/1996 | Lipp et al. .................... 340/7.41 |
| 5,686,902 A | | 11/1997 | Reis et al. |
| 5,744,874 A * | | 4/1998 | Yoshida et al. ............. 307/10.1 |
| 5,898,678 A * | | 4/1999 | Jin et al. ........................ 370/315 |
| 6,501,807 B1 | | 12/2002 | Chieu et al. |
| 6,633,753 B1 * | | 10/2003 | Kido ........................... 455/343.2 |
| 6,677,862 B1 * | | 1/2004 | Houlihane et al. ....... 340/870.03 |
| 7,577,181 B2 * | | 8/2009 | Cornwall et al. ............. 375/134 |
| 2002/0127970 A1 | | 9/2002 | Martinez |
| 2005/0269408 A1 | | 12/2005 | Esterberg et al. |
| 2006/0029029 A1 * | | 2/2006 | Jacobsen ........................ 370/343 |
| 2006/0139662 A1 | | 6/2006 | Sugiyama |
| 2007/0008136 A1 | | 1/2007 | Suzuki |
| 2007/0013482 A1 | | 1/2007 | Kato et al. |
| 2007/0046473 A1 | | 3/2007 | Kato |
| 2007/0102627 A1 | | 5/2007 | Sano et al. |

FOREIGN PATENT DOCUMENTS

| | | |
|---|---|---|
| JP | 09-008858 | 1/1997 |
| JP | 11-120306 | 4/1999 |
| JP | 2002-064404 | 2/2002 |
| WO | 99-40704 | 8/1999 |

OTHER PUBLICATIONS

Communication (with translation) from Japanese Patent Office re: related application.

* cited by examiner

*Primary Examiner* — Daniel Wu
*Assistant Examiner* — Brian Wilson
(74) *Attorney, Agent, or Firm* — Harness, Dickey & Pierce, P.L.C.

(57) ABSTRACT

An RFID interrogator device has a transmission section for transmitting a command to an RFID tag and a reception section for receiving an RF signal from the RFID tag and is configured to perform backscatter radio communication with the RFID tag. The RFID interrogator device comprises a time window setting section configured to set a time window at timing of receiving preamble data added to a head of response data transmitted from the RFID tag in response to the command, and an identifying data storage section storing preamble identifying data. The RFID interrogator device compares the data received within the time window, with preamble identifying data stored in the identifying data storage section, thereby determining whether the data received is identical to the preamble data transmitted from the RFID tag.

3 Claims, 6 Drawing Sheets

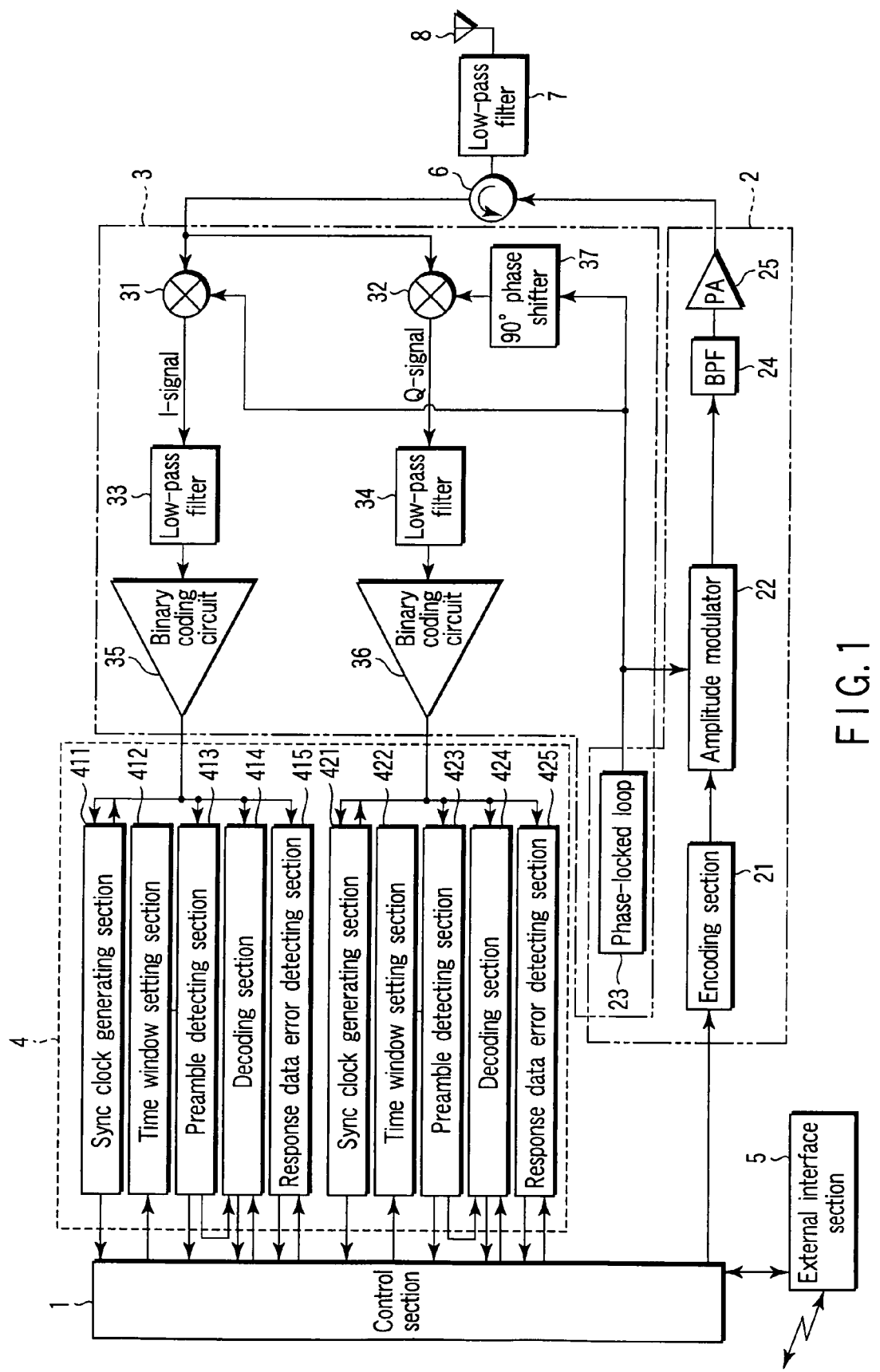
F I G. 1

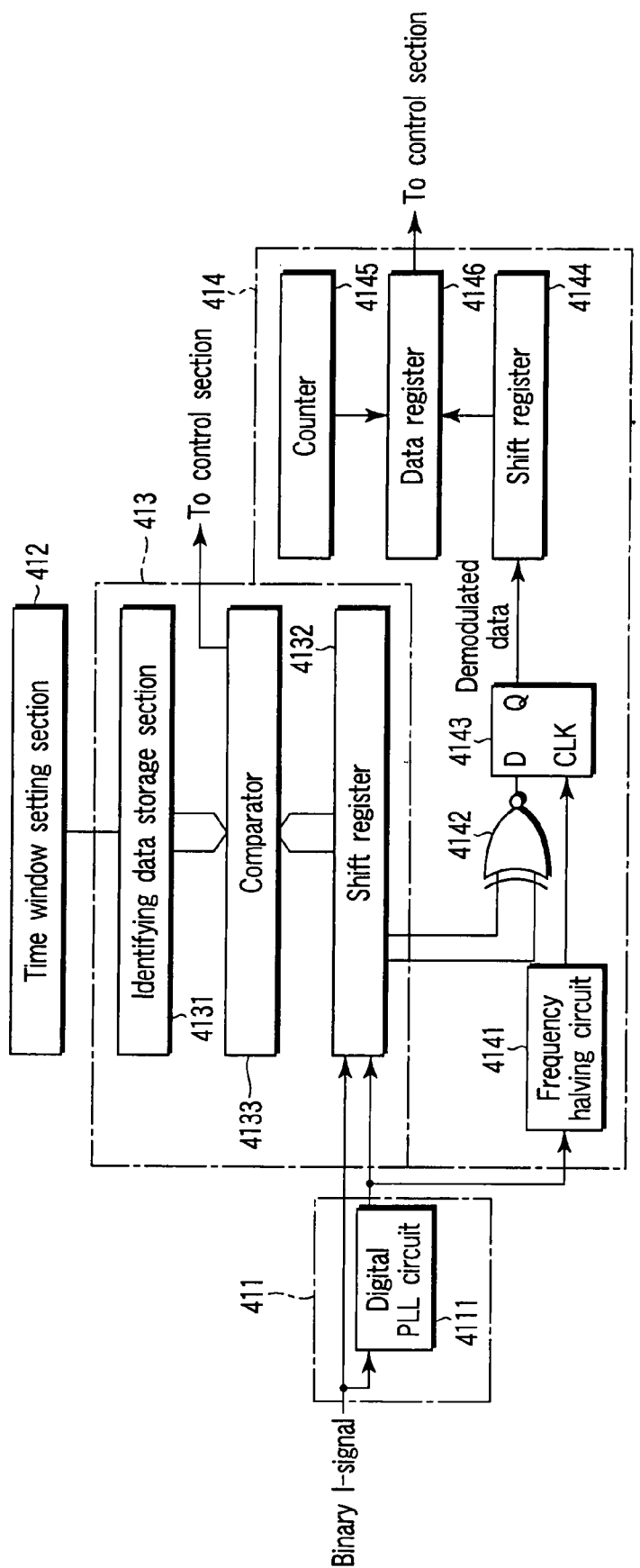
F I G. 2

US 7,978,051 B2

RFID INTERROGATOR DEVICE

CROSS-REFERENCE TO RELATED APPLICATIONS

This application is based upon and claims the benefit of priority from prior Japanese Patent Application No. 2006-208834, filed Jul. 31, 2006, the entire contents of which are incorporated herein by reference.

BACKGROUND OF THE INVENTION

1. Field of the Invention

The present invention relates to an RFID interrogator device that performs backscatter radio communication with RFID tags by using absorption and reflection of radio waves.

2. Description of the Related Art

Any RFID tag transmits, at a predetermined bit rate, a signal composed of a sync part, a response data part and an error detecting part. The sync part contains preamble data. U.S. Pat. No. 6,501,807 discloses an RFID interrogator device which compares preamble data preset in the device, with the preamble data of a signal the device has received and which determines that the signal received is a signal from an RFID tag if the preamble data of the signal is identical to the preset preamble data.

In the conventional RFID interrogator device, the preset preamble data is compared with the preamble data of any signal received. The signal the device has received inevitably contains noise. A part of the noise may be identical to the preset preamble data. In this case, the signal received will be mistaken for a signal from an RFID tag.

BRIEF SUMMARY OF THE INVENTION

An object of the present invention is to provide an RFID interrogation device that can prevent the detection of erroneous preamble data, due to noise, thereby increasing the precision of recognizing RFID tags.

According to an aspect of the present invention, there is provided an RFID interrogation device that has a reader function and performs backscatter radio communication with RFID tags by using absorption and reflection of radio waves. The RFID interrogation device comprises: a transmission section configured to transmit a command to the RFID tag; a reception section configured to receive an RF signal from the RFID tag; a time window setting section configured to set a time window at timing of receiving preamble data added to a head of response data transmitted from the RFID tag in response to the command: and an identifying data storage section storing preamble identifying data. The RFID interrogator device compares the data received within the time window, with preamble identifying data stored in the identifying data storage section, thereby determining whether the data received is identical to the preamble data transmitted from the RFID tag.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing the configuration of an RFID interrogator device according to a first embodiment of the present invention;

FIG. 2 is a block diagram showing the I-signal preamble detecting section and the decoding section, both provided in the first embodiment;

DETAILED DESCRIPTION OF THE INVENTION

First Embodiment

Figure 3:
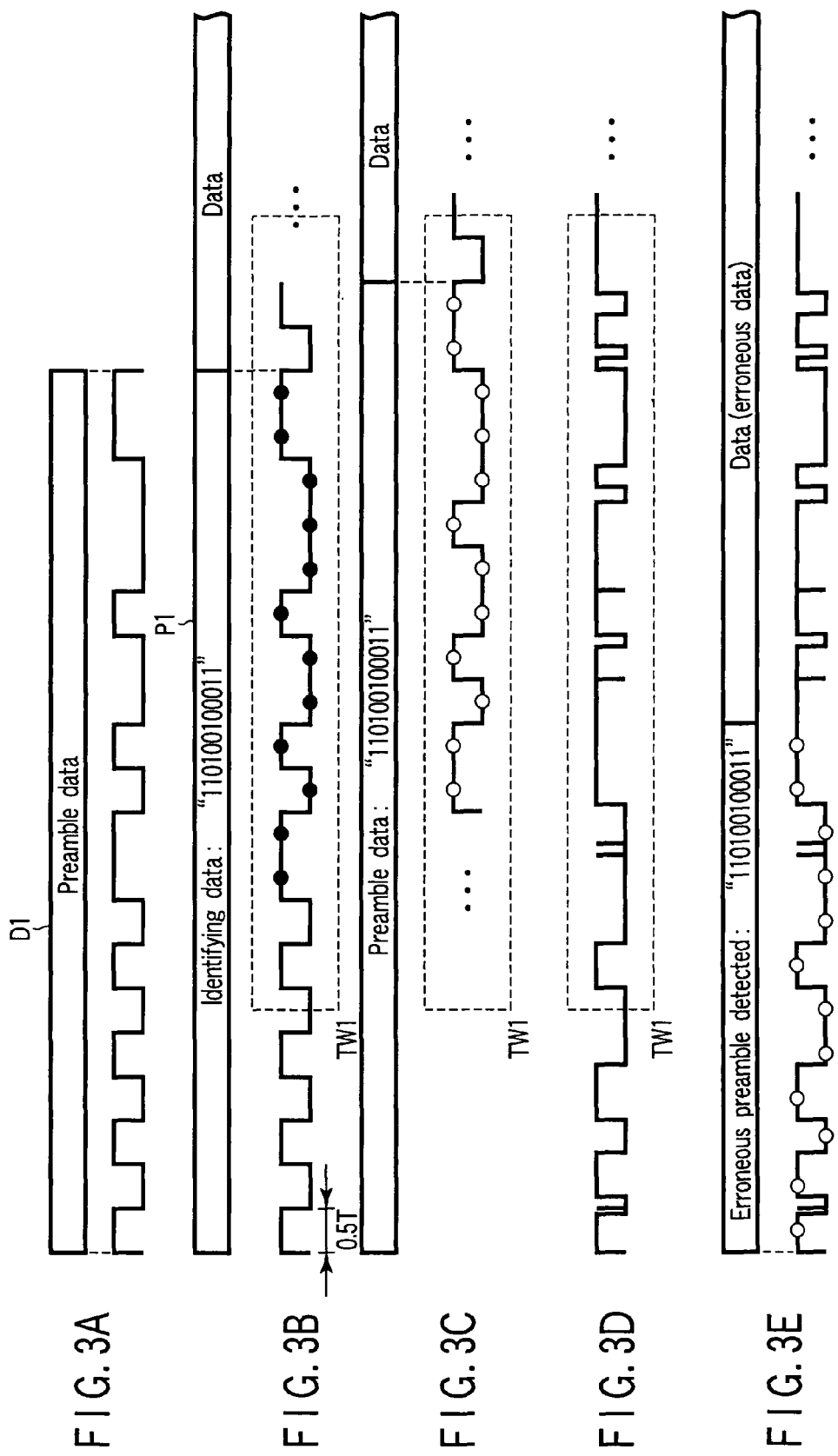
FIG. 3A is a diagram showing a pattern that the preamble data may have if the identifying data used is 12-bit data in the first embodiment.
FIG. 3B is a diagram showing the 12-bit identifying data as applied to the preamble data shown in FIG. 3A in the first embodiment.
FIG. 3C is a diagram showing a pattern that the preamble data may have if it is set within a time window in the first embodiment.
FIG. 3D is a diagram showing a pattern that data received and containing noise may have in the first embodiment.
FIG. 3E is a diagram showing a pattern that the data received may have if no time window is set in the first embodiment.

FIG. 1 is a block diagram showing the configuration of an RFID interrogator device that includes an orthogonal demodulator. The RFID interrogator device comprises a control section 1, a transmission section 2, a reception section 3, a received data processing section 4, an external interface section 5, a circulator 6, a low-pass filter (LPF) 7, and an antenna 8. The RFID interrogator device receives data from, and transmits data to, an external host apparatus via the external interface section 5.

The transmission section 2 is composed of an encoding section 21, an amplitude modulator 22, a phase-locked loop device (PLL) 23, a band-pass filter 24, and a power amplifier 25.

The transmission section 2 receives a transmission signal from the control section 1. In the transmission section 2, this signal is input to the encoding section 21. The encoding section 21 encodes the transmission signal output from the control section 1.

The encoding section 21 encodes the transmission signal into, for example, a Manchester code or an FM0 code. A Manchester code is acquired by an encoding system, wherein data rises at the center of the bit if it is 0 and falls at the center of the bit if it is 1. In other words, the code changes from 0 to 1 if the data is 0, and from 1 to 0 when the data is 1. An FM0 code is acquired by an encoding system, wherein the code is inverted at every bit border and even at the center of the bit if the data is 0.

The PLL 23 supplies a local carrier signal to the amplitude modulator 22. The amplitude modulator 22 modulates the amplitude of the local carrier signal with the transmission signal supplied from the encoding section 21. The band-pass filter 24 filters out unnecessary frequency components from the transmission signal whose amplitude has been modulated by the amplitude modulator 22. The power amplifier 25 amplifies the transmission signal that has passed through the band-pass filter 24.

The transmission section 2 is connected to the circulator 6. The signal amplified in the power amplifier 25 is supplied from the circulator 6 to the antenna 8 via the low-pass filter 7. The antenna 8 radiates the signal in the form of radio waves.

The reception section 3 is connected to the circulator 6. The reception section 3 is composed of first and second mixers 31 and 32, two low-pass filters 33 and 34, two binary coding circuits 35 and 36, a 90° phase shifter 37, and the above-mentioned PLL 23.

The reception section 3 processes a reception signal by a so-called direct conversion system, in which the carrier component is removed directly from the reception signal.

Any RF signal the antenna 8 has received from the RFID tag is supplied from the antenna 8 to the circulator 6 via the low-pass filter 7. The RF signal is then supplied from the circulator 6 to the reception section 3. In the reception section 3, the signal coming from the circulator 6 is supplied to the first mixer 31 and the second mixer 32.

The first mixer 31 receives a local carrier signal from the PLL 23. The second mixer 32 receives a signal supplied from the PLL 23 and having a phase shifted by 90° by the 90° phase shifter 37.

The first mixer 31 mixes the reception signal and the local carrier signal, generating an in-phase signal (I-signal) that has a component matching in phase with the local carrier signal. The second mixer 32 mixes the reception signal and the signal obtained by phase shifting the local carrier signal by 90°, generating a quadrature-phase signal (Q-signal) that has a component orthogonal to the local carrier signal.

The low-pass filter 33 receives an I-signal from the first mixer 31, filters out unnecessary high-frequency components from the I-signal, and outputs encoded data. The low-pass filter 34 receives a Q-signal from the second mixer 32, filters out unnecessary high-frequency components from the Q-signal, and outputs encoded data. The binary coding circuits 35 converts the I-signal coming from the low-pass filter 33, into a binary signal. The binary coding circuits 36 converts the Q-signal coming from the low-pass filter 34, into a binary signal.

The received data processing section 4 has a sync clock generating section 411, a time window setting section 412, a preamble detecting section 413, a decoding section 414, and a response data error detecting section 415, all dedicated to the I-signal. The received data processing section 4 further has a sync clock generating section 421, a time window setting section 422, a preamble detecting section 423, a decoding section 424, and a response data error detecting section 425, all dedicated to the Q-signal.

The I-signal generated by the binary coding circuits 35 is supplied from the reception section 3 to the sync clock generating section 411, preamble detecting section 413, decoding section 414 and response data error detecting section 415. The Q-signal generated by the binary coding circuits 36 is supplied from the reception section 3 to the sync clock generating section 421, preamble detecting section 423, decoding section 424 and response data error detecting section 425.

The sync clock generating section 411 dedicated to the I-signal generates, at all times, a clock signal that is synchronous with the binary signal coming from the binary coding circuit 35. The clock signal is supplied to the control section 1, preamble detecting section 413, decoding section 414 and response data error detecting section 415. The sync clock generating section 421 dedicated to the Q-signal generates, at all times, a clock signal that is synchronous with the binary signal coming from the binary coding circuit 36. This clock signal is supplied to the control section 1, preamble detecting section 423, decoding section 424 and response data error detecting section 425.

The time window setting section 412 dedicated to the I-signal sets a time window at the time the preamble detecting section 413 acquires the preamble data of the I-signal. The time window setting section 422 dedicated to the Q-signal sets a time window at the time the preamble detecting section 423 acquires the preamble data of the Q-signal.

The preamble detecting section 413 dedicated to the I-signal compares the preamble data existing at the head of the I-signal, with the preamble identifying data preset within the time window set by the time window setting section 412, thereby detecting the preamble data included in the I-signal. The preamble detecting section 423 dedicated to the Q-signal compares the preamble data existing at the head of the Q-signal, with the preamble identifying data preset within the time window set by the time window setting section 422, thereby detecting the preamble data included in the Q-signal. On detecting the preamble data included in the I-signal, the preamble detecting section 413 outputs a detection signal to the control section 1. On detecting the preamble data included in the Q-signal, the preamble detecting section 423 outputs a detection signal to the control section 1.

FIG. 2 is a block diagram that shows a reception system that detects and decodes the preamble data. The reception system shown in FIG. 2 is configured to receive the I-signal. The reception system for receiving the Q-signal has the same configuration as the reception system shown in FIG. 2.

The sync clock generating section 411 has a digital PLL circuit 4111. The sync clock generating section 411 generates a clock signal that is synchronous with the I-signal, which is a binary signal input from the binary coding circuit 35.

An RFID tag has response data and preamble data attached to the head of the response data. The preamble data is of such a pattern that it changes every 0.5 T, which is half the cycle T that corresponds to the transmission rate of the RFID tag. Therefore, the digital PLL circuit 4111 generates a clock signal whose cycle is 0.5 T, i.e., half the cycle T corresponding to the transmission rate of the RFID tag.

The sync clock generating section 411 supplies from the clock signal generated by the digital PLL circuit 4111 to the preamble detecting section 413 and the decoding section 414.

The preamble detecting section 413 is composed of an identifying data storage section 4131, a shift register 4132, and a comparator 4133, all dedicated to preamble data. The data storage section 4131 stores preamble identifying data that is used to set preambles. The comparator 4133 is provided as decision means. The shift register 4132 acquires the I-signal, i.e., the binary signal input from the binary coding circuit 35, in synchronism with the clock signal supplied from the digital PLL circuit 4111. The comparator 4133 compares the bit data acquired in the shift register 4132 within the time window set by the time window setting section 412, with the above-mentioned preamble identifying data, thereby determining whether preamble data exists or not.

The decoding section 414 is composed of a frequency halving circuit 4141, a two-input exclusive OR circuit 4142, a D-type flip-flop 4143, a shift register 4144, a counter 4145, and a data register 4146. The exclusive OR circuit 4142 has an inverting output terminal.

The frequency halving circuit 4141 receives a clock signal supplied from the digital PLL circuit 4111 and having a cycle of 0.5 T. The circuit 4141 then divides the frequency of this clock signal by 2, generating a clock signal having cycle T. The exclusive OR circuit 4142 extracts the bit data shifted in the shift register 4132, in units of two bits, thus generating an exclusive logic sum of the signals input to it. The D-type flip-flop 4143 supplies the output of the exclusive OR circuit 4142 to the D input terminal. The flip-flop 4143 also supplies the clock signal coming from the frequency halving circuit 4141, to the CLK terminal. Having this circuit configuration, the D-type flip-flop 4143 decodes every two bits stored in the shift register 4132 into "1" if the bits are [0,0] or [1,1], and into "0" if the bits are [1,0] or [0,1].

The data decoded is supplied from the D-type flip-flop 4143 to the shift register 4144. The counter 4145 counts the digits constituting the data decoded. The data register 4146 acquires this data every time data of a predetermined length is input to the shift register 4144. The data thus acquired is output to the control section 1.

The relation between the preamble pattern, the preamble identifying data and the time window will be described, with reference to FIGS. 3A to 3E.

FIG. 3A shows a pattern that preamble data D1 may have. The preamble data D1 is 20-bit data, "10101010110100100011."

The data storage section 4131, which is provided to store preamble identifying data, stores the lower 12 bits of the preamble data D1, i.e., "110100100011." These 12 bits, or identifying data P1, will be shown as black dots in FIG. 3B, if they are applied to the preamble data shown in FIG. 3A.

The broken lines shown in FIG. 3B indicate a time window TW1 that the time window setting section 412 sets for the preamble data D1. As seen from FIG. 3B, the pattern corresponding to the identifying data P1 exists within the time window TW1.

The higher bits of the preamble data D1 are unstable as the signal received by the binary coding circuit 35 rises. This is why the lower bits of the preamble data D1 are used as identifying data P1.

The binary signal corresponding to the I-signal extracted from the signal coming from the RFID tag is input to the shift register 4132 of the preamble detecting section 413. The shift register 4132 receives the binary signal, while shifting the signal bit by bit. At the time the shift register 4132 receives the first twenty bits, the comparator 4133 compares the data in the shift register 4132 with the identifying data P1, within the time window TW1 set by the time window setting section 412. More precisely, the comparator 4133 compares the lower twelve bits in the shift register 4132 with the identifying data P1. If these bits are identical to the bits constituting the comparator 4133, it is determined that the signal received is the preamble data D1. The data following the preamble data D1 is then received as response data from the RFID tag.

FIG. 3C shows a pattern that the preamble data may have if received within the time window TW1. As white dots indicate in FIG. 3C, data identical to the identifying data P1 exists within the time window TW1. Therefore, the preamble data coming from the RFID tag is correctly detected in this case.

FIG. 3D shows a pattern of the preamble data received and containing noise. In this case, the pattern existing within the time window TW1 is different from the pattern that corresponds to the identifying data P1. The preamble data is therefore determined to be erroneous.

FIG. 3E shows a pattern that the signal received may have when the time window TW1 is not set. This signal contains noise. The white dots shown in FIG. 3E coincide with the identifying data P1. These white dots are not detected as preamble data, since the time window TW1 is not set. Consequently, the signal that follows the white dots is not detected as response data coming from the REID tag, either.

How the preamble data of the I-signal is detected has been explained above. The preamble data of the Q-signal is detected in the same manner.

The signal received may be inverted, depending on its phase. It is therefore desired that the lower twelve bits in the shift register 4132 be determined to be preamble data if they are identical to the inverted pattern of the identifying data P1, or P1'="001011011100."

As mentioned above, the lower twelve bits are used as identifying data. Nevertheless, the identifying data may be constituted by any other bits.

Figure 4:
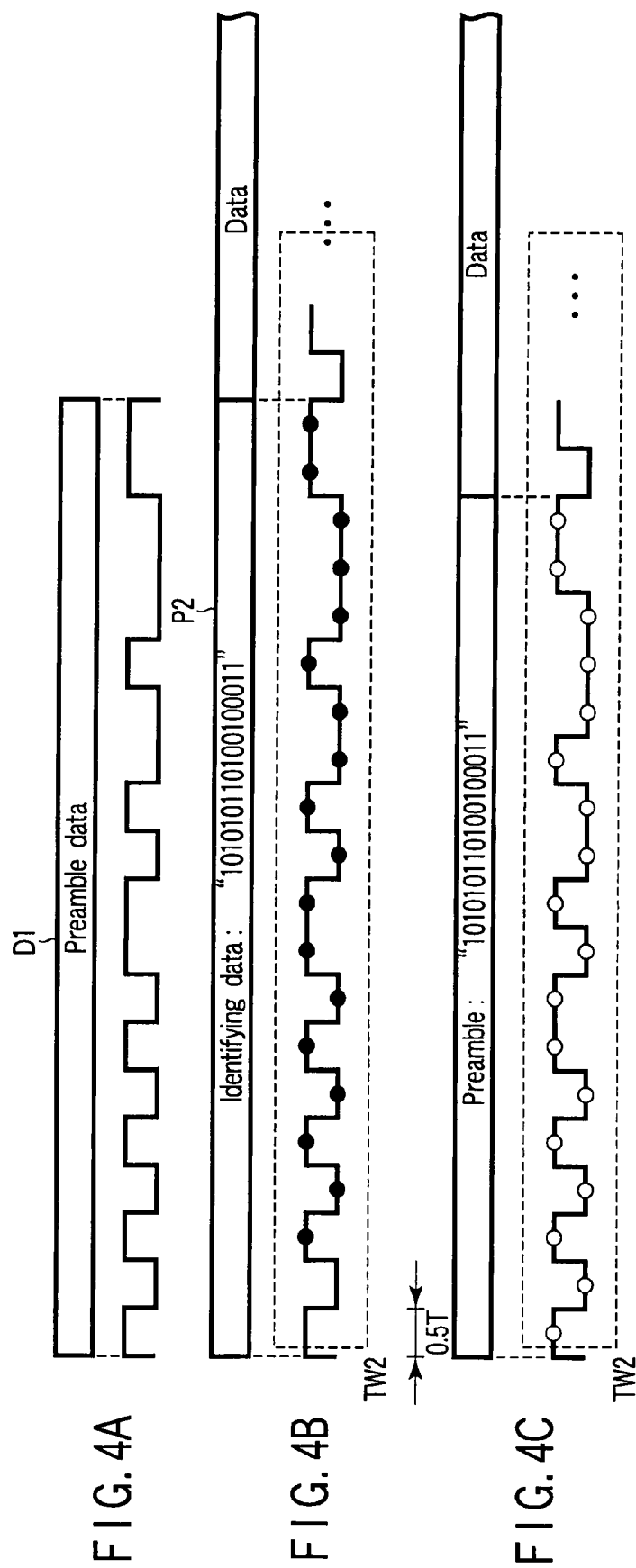
FIG. 4A is a diagram showing a pattern that the preamble data may have if the identifying data used is 18-bit data in the first embodiment.
FIG. 4B is a diagram showing the 18-bit identifying data as applied to the preamble data shown in FIG. 4A in the first embodiment.
FIG. 4C is a diagram showing a pattern that 18-bit preamble data may have if it is set within a time window in the first embodiment.

FIG. 4A to 4C show the case where the lower eighteen bits of the preamble data are used as identifying data. That is, the lower eighteen bits of the preamble data D1 having the pattern shown in FIG. 4A, i.e., "101010110100100011," are used as identifying data P2.

The pattern of this identifying data P2 will be shown as black dots in FIG. 4B, if they are applied to the preamble data D1 shown in FIG. 4A. In this case, the time window TW2 set for the preamble data D1 by the time window setting section 412 is broader than the time window TW1 as indicated by broken lines in FIG. 4B. That is, the width of the time window varies, depending on the number of bits used to determine whether the preamble is identical to the preamble identifying data.

FIG. 4C shows a pattern the preamble data may have if it is received within the time window TW2. In this case, data identical to the identifying data P2 (="101010110100100011") exits within the time window TW2 as indicated by white dots. Hence, correct preamble data coming from the RFID tag can be detected.

The number of bits constituting the identifying data is thus increased, thereby further decreasing the probability of detecting a noise-containing signal, erroneously as preamble data. This can more reliably prevent erroneous detection of the preamble data.

A method of setting the time window TW in the time window setting sections 412 and 422 will be explained. More precisely, how to set a time window for the I-signal will be explained here. Note that a time window for the Q-signal is set in the same manner.

Figure 5:
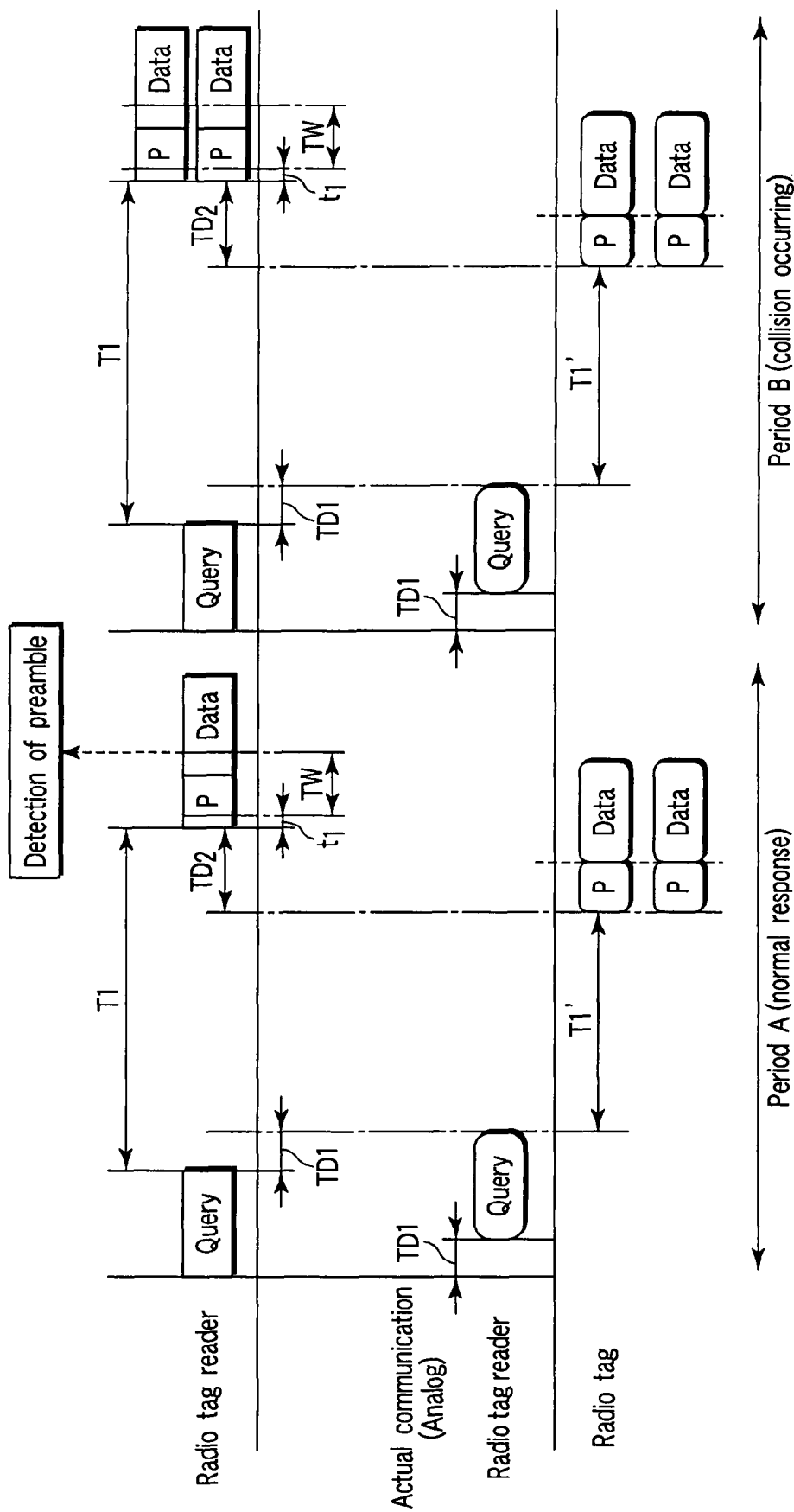
FIG. 5 is a chart illustrating the data communication between an RFID tag and the RFID interrogator device according to the first embodiment, with respect to the time windows TW that have been preset.

FIG. 5 illustrates the data communication between an RFID tag and the RFID interrogator device, with respect to the time windows TW that have been preset.

The present embodiment utilizes a backscatter scheme as a radio communication scheme. The backscatter scheme uses the absorption and reflection of radio waves transmitted from the transmission section 2 of the RFID interrogator device, so that the RFID interrogator device may accomplish radio communication with the RFID tag.

When the RFID interrogator device transmits a Query command to the RFID tag, the RFID tag responds to this command. In period A, the RFID tag correctly responds to the command, sending an appropriate response to the RFID interrogator device. In period B, a plurality of RFID tags respond at the same time, causing collision of responses.

The response time T1' the RFID tag has to the Query command is known, and the fluctuation of the response time T1' is known, too. The response time T1' is given as follows:

$$T1'\text{MIN} < T1' < T1'\text{MAX} \quad (1)$$

In the case of, for example, EPC Global, Class 1, Generation 2, which is now virtually a global standard, the minimum value T1'MIN for response time T1' is 238 μsec, and the maximum value T1'MAX for response time T1' is 262 μsec, if the transmission rate is 40 kbps.

The preamble detecting section 413 has a delay time TD1 for the transmission system and a delay time TD2 for the reception system, both resulting from the processing of digital signals. The delay time TD1 and the delay time TD2 are known because they are design values. Hence, the time T1 that the preamble detecting section 413 requires to receive the preamble data from the RFID tag after finishing the transmission of the Query command is as follows:

$$T1 = TD1 + T1'\text{MIN} + TD2 \quad (2)$$

The time window TW is determined as follows:

$$TW = 0.5T \times N + (T1'\text{MAX} - T1'\text{MIN}) \quad (3)$$

where N is the number of bits constituting the preamble identifying data used when the time window TW is applied, and 0.5 T is the sampling cycle.

That is, the time based on the minimum value T1'MIN and maximum value T1'MAX for the response time preset for the RFID tag has been added to the time window TW. More specifically, the time equivalent to the difference between the maximum and minimum values T1'MAX and T1'MIN for the response time is added to the time window TW.

Therefore, the time window TW1 is given as follows, if the lower twelve bits of the preamble data D1 shown in FIG. 3A (that is, N=12) are used as identifying data P1:

$$TW1 = 0.5T \times 12 + (T1'\text{MAX} - T1'\text{MIN})$$

The time window TW2 for the case where the lower eighteen bits of the preamble data D2 shown in FIG. 4A (that is, N=18) are used as identifying data P2 is given as follows:

$$TW1 = 0.5T \times 18 + (T1'\text{MAX} - T1'\text{MIN})$$

The time window TW need not absolutely accord with the equation (3). It may be larger than is defined in the equation (3). If it is excessively large, however, the probability of detecting noise as preamble data will increase. It is therefore undesirable to expand more than necessary.

The time window TW is opened upon lapse of the sum of time T1 and time t1 after the RFID interrogator device has transmitted the Query command. Time T1 is the time the device needs in order to receive the preamble data from the RFID tag. Time t1 is obtained by multiplying the sampling cycle 0.5 T by the difference between the number of preamble data bits and the number of preamble identifying data bits (N). If the preamble data consists of 20 bits, time t1 is:

$$t1 = (20 - N) \times 0.5T$$

The time at which the RFID interrogator device detects the preamble data is the sum of the time (T1+t1) and the time window TW. That is, the device detects the preamble data upon lapse of (T1+t1+TW) after it has transmitted the Query command.

In period A, the RFID interrogator device detects the preamble data coming from the RFID tag upon lapse of (T1+t1+TW) after the transmission of the Query command, and then outputs a preamble detection signal to the control section 1. In period B, the signals from a plurality of RFID tags collide with one another, generating noise, and the preamble data is determined to be erroneous in the time window TW.

In the RFID interrogator device so configured as described above, the control section 1 inputs the Query command to the transmission section 2. The transmission section 2 supplies the Query command via the circulator 6 and low-pass filter 7 to the antenna 8. The antenna 8 transmits the Query command. There is a time delay TD1 between the time the control section 1 inputs the Query command and the time the antenna 8 transmits the Query command.

If any RFID tag should respond to the RFID interrogator device at this time, it receives the Query command coming from the RFID interrogator device. Upon lapse of time T1', the RFID tag transmits response data to the RFID interrogator device.

When the RFID interrogator device receives the response data from the RFID tag at the antenna 8, the reception section 3 receives the response data via the low-pass filter 7 and circulator 6. In the reception section 3, the response data is input to the first and second mixers 31 and 32.

The first mixer 31 outputs an I-signal. The I-signal is supplied via the low-pass filter 33 to the binary coding circuit 35. The binary coding circuit 35 converts the I-signal to a binary I-signal. The binary I-signal is input to the sync clock generating section 411, preamble detecting section 413, decoding section 414 and response data error detecting section 415, all dedicated to the I-signal.

The second mixer 32 outputs a Q-signal. The Q-signal is supplied via the low-pass filter 34 to the binary coding circuit 36. The binary coding circuit 36 converts the Q-signal to a binary Q-signal. The binary Q-signal is input to the sync clock generating section 421, preamble detecting section 423, decoding section 424 and response data error detecting section 425, all dedicated to the Q-signal.

The preamble detecting section 413 dedicated to the I-signal detects the preamble data added to the head of the response data received within the time window TW set by the time window setting sections 412 that is dedicated to the I-signal. Then, the preamble detecting section 413 compares the preamble data, thus detected, with the preamble identifying data that has been already stored.

The preamble detecting section 423 dedicated to the Q-signal detects the preamble data added to the head of the response data received within the time window TW set by the time window setting sections 422 that is dedicated to the Q-signal. Then, the preamble detecting section 423 compares the preamble data, thus detected, with the preamble identifying data that has been already stored.

The time window TW starts when the RFID interrogator device finishes transmitting the Query command to the RFID tag and ends when the period (T1+t1) elapses thereafter. If the preamble identifying data is consist of the lower twelve bits of the preamble data, the lower twelve bits of the preamble data added to the response data received will fall within the time window TW.

The data existing in the time window TW are compared with the preamble identifying data. If the response data received from the RFID tag is correct data, the data within the time window TW will be identical to the preamble identifying data. In this case, the RFID interrogator device determines that the response data has been received from the RFID tag.

If the response data received from the RFID tag contains noise and is therefore incorrect data, however, the data within the time window TW will not be identical to the preamble identifying data, at high probability. In this case, the RFID interrogator device does not determine that the response data has been received from the RFID tag.

Erroneous detections of the preamble data, due to noise, can thus be avoided in the present embodiment. This can enhance the precision of recognizing RFID tags.

Second Embodiment

A second embodiment of the present invention will be described, in which the received data processing section 4 used in the first embodiment is incorporated in the form of software and a program is executed to determine whether the preamble data exists or not. The second embodiment is identical to the first embodiment, except that the received data processing section 4 is incorporated in the control section 1. Thus, no block diagrams of the second embodiment are attached hereto, and the configuration of the second embodiment will not be described.

Figure 6:
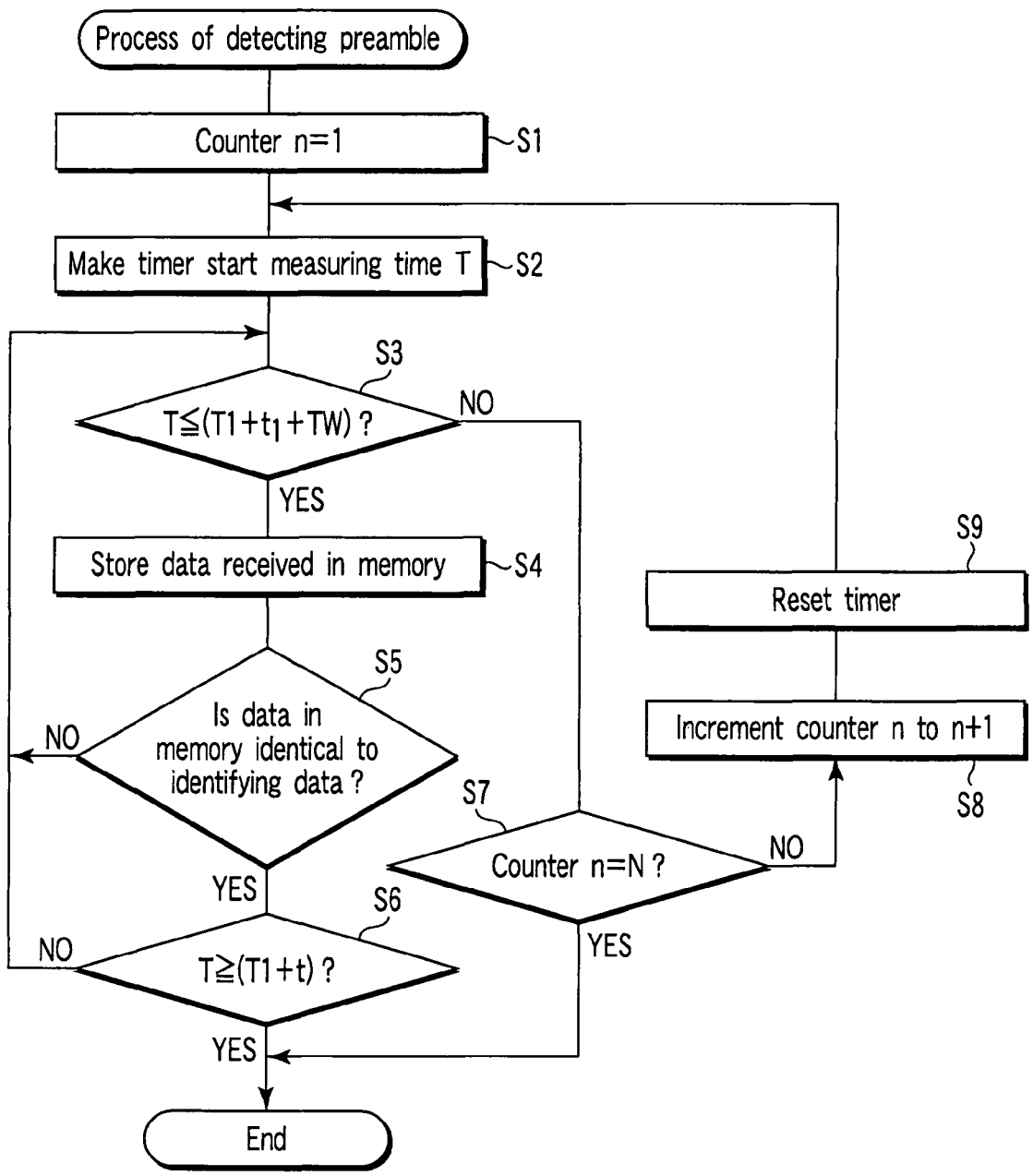
FIG. 6 is a flowchart explaining the preamble detecting process performed in the control section provided in a second embodiment of the present invention.

The control section 1 executes the program, detecting the preamble as illustrated in the flowchart of FIG. 6. First, the control section 1 sets the count of the counter n to "1" in Step S1. Then, a timer starts measuring time T in Step S2. In Step S3, the control section 1 determines whether T$\leq$(T1+t1+TW) or not.

If T$\leq$(T1+t1+TW), the control section 1 stores the received data into a memory in Step S4. In Step S5, the control section 1 determines whether the data in the memory is identical to the preset preamble identifying data.

If the data is not identical to the preset preamble identifying data, the process returns to Step S3. Thereafter, Steps S3 to S5 are repeated.

The control section 1 may determine in Step S5 that the data in the memory is identical to the preset preamble identifying data. If this is the case, the control section 1 determines in Step S6 whether T$\geq$(T1+t1).

If T$\geq$(T1+t1) in Step S6, the control section 1 determines that the data is identical to the preamble identifying data within the time window TW and then terminates the process of detecting the preamble. In other words, the data received is found to contain the preamble data coming from the RFID tag. The control section 1 then performs a process of acquiring the response data that follows the preamble data. This process will not be explained here.

Even if the data in the memory is found to be identical to the preamble identifying data, the control section 1 determines that the preamble data has not been detected, unless T$\geq$(T1+t1). That is, the control section 1 determines that the data is outside the time window TW and does not recognize the data as preamble data. The process then returns to Step S3.

If the time T measured by the timer increases over (T1+t1+TW) while no preamble data is being detected, the control section 1 determines that the preamble data has not been detected. In this case, the control section 1 determines in Step S7 whether the count of the counter n has reached a predetermined value N. Unless n=N, the control section 1 increases the count of the counter n by one in Step S8. Then, in Step S9, the control circuit 1 resets time T in the timer. The process then returns to Step S2. Steps S2 to S5 and Step S6 are repeated.

No preamble data may be detected even if the count of the counter n reached the value N. In this case, the control section 1 determines that there exists no preamble data to detect and terminates the process of detecting the preamble.

To detect preamble data by using software, too, a time window TW is set and it is determined whether the data in the memory is identical to the preamble identifying data within the time window TW. Thus, no preamble data is detected at high probability if the reception signal is not correct response data coming from the RFID tag, but data that contains noise. Erroneous detection of preambles, due to noise, can therefore be avoided. This can enhance the precision of recognizing RFID tags.

To detect preamble data, whether the data in the memory is identical to the preamble identifying data within the time window TW is determined not only once, but several times. A preamble can therefore be eventually detected even if it has not been detected because the response data coming from a RFID tag contains temporary noise. Thus, the RFID interrogator device can reliably receive the response data transmitted from the RFID tag.

In the embodiments described above, the transmission section 2 and the received data processing section 4 are components that work independently of each other. Nonetheless, the received data processing section 4 may be incorporated into the transmission section 2, so that a larger transmission section may be provided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An RFID interrogator device, transmitting query data to an RFID tag and receiving response data from the RFID tag after lapse of predetermined time, comprising:
    a time window setting section configured to set a time window at timing of receiving predetermined lower bits of preamble data added to a head of response data transmitted from the RFID tag;
    an identifying data setting section configured to set the predetermined lower bits of preamble data as preamble identifying data; and
    decision means for comparing data received within a range of the time window set by the time window setting section, with preamble identifying data set by the identifying data setting section, thereby determining whether the data received is identical to the preamble data transmitted from the RFID tag;
    wherein the time window setting section sets the time window to start at a sum of a time that elapses until the preamble data is received from the RFID tag and a time obtained by multiplying a sampling cycle by a difference between the number of preamble data bits and the number of preamble identifying data bits.

2. The RFID interrogator device according to claim 1, wherein the time window setting section sets the time window based on the number of bits constituting the preamble identifying data and the sampling cycle.

3. The RFID interrogator device according to claim 2, wherein the time window is assigned with a time equivalent to a difference between maximum and minimum values preset for a predetermined response time of the RFID tag.

* * * * *